United States Patent Office 3,454,418
Patented July 8, 1969

3,454,418
COATING COMPOSITIONS CONTAINING STYRENE-ALLYL ALCOHOL COPOLYMER, EPOXY RESIN, AND PHENOL FORMALDEHYDE
John W. Forsberg, Mentor-on-the-Lake, Ohio, assignor to The Lubrizol Corporation, Wickliffe, Ohio, a corporation of Ohio
No Drawing. Filed Apr. 17, 1967, Ser. No. 631,151
Int. Cl. C08g 45/08; B44d 1/14
U.S. Cl. 117—75
9 Claims

ABSTRACT OF THE DISCLOSURE

Metal coating compositions are prepared from a polymeric polyol (preferably a styrene-allyl alcohol copolymer), an epoxy resin, phosphoric acid, a phosphoric acid-epoxide-metal base reaction product, and a solid thermosetting phenolaldehyde resin. They impart improved detergent resistance to metals when applied thereto and baked at a metal temperature of at least about 250° C., whether or not a siccative topcoat is then applied. They also provide an attractive color when used as topcoats; depending on baking time and temperature, the color varies from gold to dark walnut.

This invention relates to compositions for coating metal surfaces, and more particularly to new metal coating compositions characterized by improved detergent resistance and an attractive color. Specifically, the invention relates to a liquid composition of matter, suitable for providing a protective film on a metal surface, which comprises:

(A) About 15–20 parts by weight of a polymeric polyol;
(B) About 1–50 parts of an epoxy resin;
(C) About 2–40 parts of phosphoric acid;
(D) About 5–15 parts of a metal-containing composition prepared by (1) reacting one mole of phosphoric acid with up to about 5 equivalents of an organic epoxide, and (2) reacting the product thus formed with about 0.4–2.0 equivalents of a metal base; and
(E) About 20–60 parts of a solid phenol-aldehyde resin which is capable of being cured to a thermoset state.

With the increased manufacture and use of automatic washers and similar appliances, the problem of attack by detergents on painted metal surfaces is often a serious one. It has become important, therefore, to develop metal coatings which are resistant to detergent attack. In general, the application of paint alone to a metal surface, or even to a phosphated metal surface, is not satisfactory; the paint application must be preceded by the formation of a detergent-resistant film on the metal which adheres thereto and which also adheres to the paint layer under chemically severe conditions.

A second developing field of metal coatings, which at first glance appears to be far removed from the one discussed above, is in the field of hardware for construction use. Metal fixtures used in homes and other buildings, where they may be exposed and visible to those using the building, are preferably given a surface coating which adds to their attractiveness. In particular, a gold, copper, or walnut-brown coloration is often desired.

A principal object of the present invention, therefore, is to provide a coating composition for metals which may be used as a primer coating for painted surfaces which are subject to attack by detergents and the like.

A further object is to provide a metal coating composition which adheres strongly to the metal and which has an attractive color.

Still another object is to prepare coated metal articles for a wide variety of uses.

Other objects will in part be obvious and will in part appear hereinafter.

As indicated hereinabove, the compositions of the present invention contain a polymeric polyol, an epoxy resin, phosphoric acid, a phenol-aldehyde resin capable of thermosetting, and the reaction product of phosphoric acid with an organic epoxide and a metal base. Ordinarily, it is convenient to employ a solution of said composition in one or more organic solvents. The type of solvent to be used will depend largely on the manner in which the composition is to be applied to the metal surface. When it is desired to coat the metal surface by immersion, relatively volatile solvents such as methyl isobutyl ketone, isobutyl alcohol, ethyl acetate and the like are preferred. When the composition is to be applied by spraying, either volatile or non-volatile solvents may be used; thus, methyl isobutyl ketone, a volatile solvent, or ethylene glycol monobutyl ether, a relatively non-volatile solvent, may be used for spraying. In the case of brushing or roller coating it is preferable to use a non-volatile solvent. The substance used for solvents are generally oxygenated such as those illustrated above, although mixtures of oxygenated and hydrocarbon solvents often provide satisfactory results. The use of a solvent not only insures the ready solubility of all the ingredients of the coating composition, but also aids in the deposit of a thin, uniform protective film on the metal surface.

Component A in the compositions of this invention is, as indicated, a polymeric polyol. The term "polymeric polyol" is intended herein to include any polymeric composition which contains hydroxy groups. Examples of such compositions are polyvinyl alcohol, allyl alcohol polymers (especially copolymers with various unsaturated compounds), polyoxyalkylene compounds and the like. The preferred composition is a copolymer of allyl alcohol and a vinyl aromatic compound, which is preferably styrene but may be a substituted styrene such as chlorostyrene, alkyl-substituted styrenes, and α-methylstyrene. Low molecular weight copolymers prepared from an approximately equimolar mixture of the two monomers are preferred. The molecular weight should preferably be about 500–2500.

Component B of the compositions of this invention is an epoxy resin. As used herein, the term "epoxy resin" includes such compounds as the reaction product of two moles of epichlorohydrin with one mole of a polyhydric phenol such as Bisphenol A and also includes higher condensation products derived therefrom. The phenols suitable for preparing these resins include, in general, all polyhydric phenols such as Bisphenol A, resorcinol, hydroquinone, catechol, and similar compounds prepared from naphthalene or anthracene. In place of epichlorohydrin there may be used other halohydrins such as epibromohydrin or the epihalohydrins of mannitol, sorbitol, erythritol, glycerol and the like.

As for the phosphoric acid (component C), it is preferably 85% aqueous phosphoric acid. More concentrated solutions can be used, and in some instances it is preferable to use 100% phosphoric acid or even polyphosphoric acid. In other cases it is desirable to use less concentrated solutions such as 60% or 25% solutions. The more dilute solutions, however, sometimes cause solubility problems such as the formation of haze.

Component D in the present invention is the product formed by reacting phosphoric acid with an organic epoxide and then reacting the product thus formed with a metal base. This product is more fully described in co-pending application Ser. No. 565,740, filed July 18, 1966. For the first step of the reaction leading to the preparation of component D, it is preferred to use concentrated phosphoric acid, typically 85% or greater and desirably about 100%. Typical of the expoxides which may be reacted therewith are aliphatic epoxides such as ethylene, propylene or butylene oxides; aromatic ones such as styrene oxide; ethers such as allyl glycidyl ether or polymers thereof; epoxy resins as defined above; and the like. The preferred epoxides are the aliphatic ones, especially propylene oxide. With reference to epoxides, the term "equivalent" is the number of grams or other weight units equal to the molecular weight of the epoxide divided by the number of epoxy groups per molecule.

The reaction of phosphoric acid with the epoxide is exothermic and is best controlled by adding the epoxide gradually to the phosphoric acid. In general, the temperature increases to about 70–90° C. during the epoxide addition. In some cases, the application of external heat may be necessary. Ordinarily, up to about 5 equivalents and preferably about 1–2.5 equivalent of the epoxide is added per mole of phosphoric acid.

In the second step of the process, the phosphoric acid-epoxide product is reacted with a metal base, preferably at a temperature of about 40–80° C. Suitable metal bases include, for example, the oxides, hydroxides, carbonates, bicarbonates, alkoxides, phenates, sulfides, and similar compounds of alkaline earth and transition metals such as zinc, magnesium, manganese, cadmium, aluminum, iron, tin, and alkali metals (especially lithium). Zinc is the preferred metal, and zinc oxide the preferred metal base. For each mole of phosphoric acid used in the preparation of the epoxide-phosphoric acid reaction product, about 0.4–2.0 equivalents of the metal base is used; preferably, the ratio of equivalents of metal base to moles of phosphoric acid is between about 0.8:1 and 1:1. An oxygenated organic solvent such as an alcohol, ether, ketone, ether alcohol or the like is preferably used as the reaction medium.

After the metal base is completely dissolved in the reaction mixture, it is preferred that water be removed by heating said mixture to about 110–180° C., optionally under reduced pressure or while purging the system with an inert gas such as nitrogen.

While the chemical composition and structure of the reaction product used as component D is not known with certainty, it is believed that the product is a mixture of compounds conforming in general to the formula

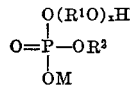

wherein $R^1$ is a substituted or unsubstituted ethylene radical; $R^2$ is hydrogen, a metal cation or $(R^1O)_xH$; M is one equivalent of a metal cation; and $x$ is an integer from 1 to about 5.

The preferred composition for use as component D is prepared by the reaction of one mole of phosphoric acid with about 1–2.5 equivalents of propylene oxide and about 0.8–1 equivalent of zinc oxide. The following examples illustrate the preparation of this and other compositions suitable for use as component D.

Example 1

To 2940 grams (30 moles) of 100% phosphoric acid is added, over 2½ hours, 1740 grams (30 moles) of propylene oxide. The temperature rises to 50° C. as the propylene oxide addition is commenced and is held to 50–60° C. during the addition by means of a cold water bath. After the addition of the propylene oxide, the mixture is heated for one-half hour at 65–70° C.

To 2340 grams of the propylene oxide-phosphoric acid reaction product thus prepared, at 60° C., is added 610 grams (15 equivalents) of zinc oxide over one-half hour. The temperature rises to 115° C. during the zinc oxide addition. The mixture is heated to 128–138° C. and purged with nitrogen for six hours. During this period, water is evolved from the reaction mixture; the total amount of water recovered is 133 ml. After water removal is complete, 1875 grams of ethylene glycol monobutyl ether is added over ten minutes. The mixture is stirred for 15 minutes and allowed to stand overnight. Finally, filter aid (2% by weight) is added and the solution is filtered.

The product is a 60% ethylene glycol monobutyl ether solution of the compound having a propylene oxide (moles): phosphoric acid (moles): zinc oxide (equivalents) ratio of 1.0:1.0:0.5; it contains 10.6% zinc and 10.1% phosphorus.

Example 2

A solution of 780 grams (5.0 moles) of a 1:1 propyloxide-phosphoric acid reaction product, prepared according to the method described in Example 1, in 939 grams of 1-hexanol is heated to 50° C. and 204 grams (5.0 equivalents) of zinc oxide is added over a 5-minute period. The solution is heated at 130° C. (reflux temperature) for 20 minutes and the water evolved (29 ml.) is collected in a trap. After the water has been removed, filter aid (3% by weight) is added to the solution which is then cooled and filtered. The product is obtained as a 50% solution in 1-hexanol; it has a zinc content of 7.95% and a phosphorus content of 8.20%.

Example 3

The procedure of Example 2 is repeated, except that the ratio of moles of the propylene oxide-phosphoric acid reaction product to equivalents of zinc oxide is 1:0.91 and the solvent is 4-methyl-2-pentanol, which is present in an amount sufficient to form a 50% solution of the product.

Example 4

Eight hundred grams of the product of Example 3 and 400 grams of diethylene glycol are mixed and heated for two hours at 145° C., while purging with nitrogen. The 4-methyl-2-pentanol is removed by evaporation and the residue is the desired 50% solution of the product in diethylene glycol.

Example 5

Following the procedure of Example 1, a reaction product is prepared from 3.0 moles of propylene oxide, 3.0 moles of phosphoric acid, 7.5 equivalents of zinc oxide and 785 grams of ethylene glycol monobutyl ether. The product, a 60% solution in ethylene glycol monobutyl ether, contains 9.25% zinc and 8.95% phosphorus.

Example 6

A propylene oxide-phosphoric acid reaction product with a 1.5:1 molar ratio of propylene oxide to phosphoric acid is prepared by a method similar to that described in Example 1. To a solution of 925 grams (5.0 moles) of this product in 925 grams of 1-hexanol is added 204 grams (5.0 equivalents) of zinc oxide. The addition takes place over a ten-minute period during which the temperature rises to 40° C. The mixture is then heated to 133–154° C. for one hour, during which time 45 grams of water is removed by distillation. An additional 45 grams of 1-hexanol is then added and the material is filtered. There is obtained a 55% solution in 1-hexanol of the reaction product which contains 7.10% phosphorus and 6.44% zinc.

Example 7

Following the procedure of Example 1, a 3:1 propylene oxide-phosphoric acid reaction product is prepared. A solution of two moles of this product in 607 grams of 4-methyl-2-pentanol is reacted with one mole of zinc oxide according to the procedure described in the previous examples. The product, a 50% solution in 4-methyl-2-pentanol, contains 5.22% zinc and 4.95% phosphorus.

Example 8

A 1:1 allyl glycidyl ether-phosphoric acid reaction product is prepared by the method of Example 1. To a solution of 424 grams (2.0 moles) of this product in 487 grams of 1-hexanol is added 81 grams (2.0 equivalents) of zinc oxide at 50° C. over 15 minutes. The mixture is heated to 140° C. and purged with nitrogen to remove water, and is then cooled and filtered. The product, a 50% solution in 1-hexanol, contains 5.68% zinc and 5.8% phosphorus.

Example 9

A solution of 624 grams (4.0 moles) of a 1:1 propylene oxide-phosphoric acid addition product in 668 grams of isohexanol is heated to 50° C. and 81 grams (4.0 equivalents) of magnesium oxide is added. The mixture is heated to 120° C. and a current of nitrogen is passed through to remove water; then 200 grams of xylene is added. The solution is cooled and filtered, yielding a 43% solution of a magnesium oxide-propylene oxide-phosphoric acid reaction product containing 0.28% magnesium and 6.28% phosphorus.

Example 10

A solution of 428 grams (2.0 moles) of a 2:1 reaction product of propylene oxide with phosphoric acid in 520 grams of dioxane is heated to 50° C., and 92 grams (2.0 equivalents) of manganous oxide is added. The mixture is heated under reflux at 100° C. for about 1½ hours, after which time 115 grams of dioxane is added. After another hour of refluxing an additional 145 grams of dioxane is added. Finally, the solution is filtered with the addition of 2% by weight of filter aid. The product, a 40% solution in dioxane, has a manganese content of 4.22% and a phosphorus content of 5.09%.

Example 11

A solution of 624 grams (4 moles) of a 1:1 propylene oxide-phosphoric acid reaction product in 490 grams of 1-hexanol is heated to 40° C. and 230 grams (4 equivalents) of manganous carbonate is added slowly over 1¼ hours as the temperature is increased to 60° C. After the addition of manganous carbonate is complete, the mixture is heated to 70° C. until gas evolution ceases. There is obtained a viscous material (60% solution in 1-hexanol) containing 5.50% manganese and 10.55% phosphorus.

Example 12

A 1:1 propylene oxide-phosphoric acid reaction product is prepared according to the method described in Example 3, from 392 grams (4.0 moles) of phosphoric acid and 232 grams (4.0 moles) of propylene oxide). Ferric oxide, 160 grams (3 equivalents), is added at a temperature of 50° C., the mixture is blown with nitrogen at 50–130° C. to remove water and is filtered (with the addition of 3% filter aid). The product has an iron content of 3.76% and a phosphorus content of 8.43%.

Example 13

A propylene oxide-phosphoric acid-stannous oxide reaction product is prepared by a method similar to that described in Example 2 from 2 moles of propylene oxide, 2 moles of phosphoric acid and 2 equivalents of stannous oxide. The solvent is 1-hexanol (429 grams). The product, a 50% solution, contains 0.76% tin and 5.79% phosphorus.

Example 14

Zinc sulfide, 146 grams (3.0 equivalents), is added to a solution of 468 grams (3.0 moles) of a 1:1 propylene oxide-phosphoric acid reaction product in 563 grams of 4-methyl-2-pentanol at a temperature of 65–85° C. The reaction mixture is heated at about 130° C. for 1½ hours, the evolved hydrogen sulfide being collected by absorption in a caustic solution. It is then purged with nitrogen for 1½ hours at 125° C.; nitrogen purging is continued for an additional hour as the temperature is decreased to 85° C. The solution is treated with 3% by weight of filter aid and filtered. The product is a clear, yellow fluid (50% solution in 4-methyl-2-pentanol) of the zinc-phosphorus compound containing 1.36% zinc and 9.20% phosphorus.

Example 15

Following the procedure of the above examples, a lithium hydroxide-propylene oxide-phosphoric acid reaction product is prepared from 168 grams (4.0 equivalents) of lithium hydroxide and 624 grams (4.0 moles) of a 1:1 propylene oxide-phosphoric acid reaction product in 648 grams of 1-hexanol. After filtration, the product is obtained as a clear golden fluid (50% in 1-hexanol) containing 0.327% lithium and 5.25% phosphorus.

Example 16

Following the procedure of the foregoing examples, 740 grams (4.0 moles) of a 1.5:1 propylene oxide-phosphoric acid reaction product is reacted wtih 112 grams (4.0 equivalents) of calcium oxide in 1816 grams of 1-hexanol at 152° C. Upon filtration, there is obtained a milky liquid of low viscosity (50% in 1-hexanol) containing 2.85% calcium and 6.80% phosphorus.

Example 17

A 1:1 styrene oxide-phosphoric acid reaction product is prepared as in Example 1. Zinc oxide, 82 grams (2.0 equivalents), is added over 15 minutes to a solution of 436 grams (2.0 moles) of this reaction product in 500 grams of 1-hexanol, at 50–62° C. Water formed in the reaction is removed by distillation under nitrogen at 70–120° C.

The residue from the distillation is filtered to remove a milky white solid which is apparently predominantly $ZnHPO_4$. The filtrate (yield 815 grams) contains 1.98% zinc and 4.74% phosphorus.

Component E of the compositions of this invention is a solid, curable phenol-aldehyde resin. These resins are formed by the reaction of phenol, cresols and the like with aldehydes such as formaldehyde, acetaldehyde and furfural and are well known in the art. The ones suitable for use in the present invention are those which can b ecured to a thermoset state by baking and are, in general, what is known as "resitol" or "B-stage" resins. These are solid, linear substances containing active hydrogens on the phenol rings and methylol groups attached thereto. Upon heating, these groups inter-react to form a cured, crosslinked product which is insoluble and infusible. The important thing about the phenol-aldehyde resins used according to this invention is that they must be capable of such curing upon heating. Many products of this type are known to those skilled in the art, and it is believed unnecessary to unduly lengthen this specification by naming them.

To prepare the compositions of this invention, the ingredients and solvent are charged to a convenient vessel and heated until a homogeneous solution is obtained. The order of addition is not critical. Because the phenol-aldehyde resin is often difficult to dissolve, relatively prolonged heating at temperatures up to about 100° C. may be required.

The compositions of this invention are prepared from about 15–20 parts of component A, about 1–50 parts of component B, about 2–40 parts of component C, about 5–15 parts of component D, and about 20–60 parts of component E. Preferably, they contain 15–20 parts of A, 20–25 parts of B, 5–15 parts each of C and D, and 35–50 parts of E. Additional ingredients may also be added for special purposes. Among the most useful are silica and aqueous solutions of partially reduced chromic acid and polyvalent metal dichromates. The latter are disclosed in U.S. Patent 3,282,744 and comprise, in general, solutions acid in which the ratio of hexavalent chromium to trivalent chromium is within the range from about 0.5 to about 5, preferably from about 0.8 to about 3, in which solutions about 20–80 percent and preferably about 30–70 percent of the chromium content thereof is contributed by said partially reduced chromic acid. Such dilute aqueous solution will generally contain from about 0.01 to about 0.3 percent and more often from about 0.03 to about 0.1 percent of chromium.

It is known, as exemplified by U.S. Patents 2,768,104 and 3,063,877, to reduce chromic acid partially by means of oxidizable compounds such as formeldehyde, ethanol, glycol and other polyalcohols, phenol, hydroquinone, potassium iodide, etc., and then to use a dilute solution of such partially reduced chromic acid as a corrosion-proofing composition. Example I of U.S. Patent 3,063,-877, for example, describes the preparation of a partially reduced chromic acid (ratio of hexavalent chromium to trivalent chromium: 1.27) by the reaction below 180° F. of a solution of chromic acid (prepared by dissolving 170 pounds of $CrO_3$ in 40 gallons of water) with a solution of 48 pounds of 36.6 percent aqueous formaldehyde in 21 gallons of water. From the standpoint of convenience and economy, however, it is generally preferred to use methanol as the reducing agent. The following examples are presented to illustrate additional specific modes of preparing partially reduced chromic acid useful for the purposes of the present invention. Unless otherwise indicated, all parts and percentages are by weight.

Example 18

432 parts of water is introduced into a reaction vessel and 550 parts of $CrO_3$ is added thereto over a period of 20 minutes at 27–32° C. The whole is heated to 93° C. over a period of 1.5 hours and a mixture of 29 parts of methanol with 29 parts of water is added thereto beneath the surface of the chromic acid solution over a period of 4 hours at 90–99° C. A very exothermic reaction occurs and the addition must be made carefully to avoid a too vigorous reaction. Approximately 40 parts of carbon dioxide is formed as a consequence of the complete oxidation of the methanol. After all of the methanol has been added, the whole is stirred for 1 hour at 96° C. The product, a concentrated aqueous solution of partially reduced chromic acid, shows the following analyses.

Chromium _____ percent__ 28.45
Hexavalent chromium _____ do____ 19.55
Trivalent chromium _____ do____ 8.90
Ratio of hexavalent chromium to trivalent chromium _____ do____ 2.2

Example 19

To 1100 grams of $CrO_3$ dissolved in 2500 grams of water and heated to 90–100° C., there is added dropwise a mixture of 128 grams of methanol and 128 grams of water. The highly exothermic reaction maintains the temperature at 90–100° C. After all of the aqueous methanol has been added (approximately 8 to 10 hours required), the whole is stirred for an additional hour to insure complete reaction. The material in the reaction vessel is then diluted with sufficient water to yield 3 liters of solution. The resulting product, a concentrated aqueous solution of partially reduced chromic acid, shows the following analyses.

Chromium _____ percent__ 14.75
Ratio of hexavalent chromium to trivalent chromium _____ do____ 1.15

Example 20

An experiment is carried out in the same manner set forth in Example 19, except that a mixture of 89.6 grams of methanol and 89.6 grams of water is employed. The resulting product, a concentrated aqueous solution of partially reduced chromic acid, shows the following analyses.

Chromium _____ percent__ 14.9
Ratio of hexavalent chromium to trivalent chromium _____ do____ 1.68

Example 21

An experiment is carried out in the same manner set forth in Example 19, except that a mixture of 48 grams of methanol and 48 grams of water is employed. The resulting product, a concentrated aqueous solution of partially reduced chromic acid, shows the following analyses.

Chromium _____ percent__ 15.45
Ratio of hexavalent chromium to trivalent chromium _____ do____ 3.0

The other active ingredient of the compositions of U.S. Patent 3,282,744 is calcium dichromate. Although anhydrous calcium dichromate ($CaCr_2O_7$) may be employed, it is generally more convenient to use a concentrated aqueous solution thereof, because such solution dissolves immediately in water upon mixing. For example, the reaction of a slurry of 1.72 parts of calcium hydroxide in 6.5 parts of water with 5.1 parts of $CrO_3$ for about 8 hours at 110°–120° F. yields an aqueous concentrate containing 45 percent of calcium dichromate.

The dilute aqueous solution of the above-identified ingredients will ordinarily contain from about 0.01 to about 0.3 percent of chromium. When less than about 0.01 percent of chromium is present, the corrosion-proofing characteristics of the solution fall off quite rapidly. Preferably, the chromium content of the solution will be from about 0.03–0.1 percent. It is important that about 20–80 percent and preferably about 30–70 percent of the chromium content of the solution be contributed by said partially reduced chromic acid. It is likewise important that the ratio of hexavalent chromium to trivalent chromium in said partially reduced chromic acid be within the range from about 0.5 to about 5, preferably from about 0.8 to about 3.

A number of specific examples of aqueous corrosion-proofing compositions of this invention are given in the following table. They are prepared by simply dissolving the indicated components in water.

| | Partially reduced chromic acid | | Calcium dichromate, present in an amount to supply the indicated percent of chromium |
|---|---|---|---|
| Example | Identity | Present in an amount to supply the indicated percent of chromium | |
| 22 | Prod. of Ex. 19 | 0.025 | 0.025 |
| 23 | Prod. of Ex. 20 | 0.025 | 0.025 |
| 24 | Prod. of Ex. 21 | 0.025 | 0.025 |
| 25 | Prod. of Ex. 19 | 0.05 | 0.025 |
| 26 | Prod. of Ex. 20 | 0.075 | 0.025 |
| 27 | Prod. of Ex. 21 | 0.03 | 0.09 |
| 28 | Prod. of Ex. 19 | 0.09 | 0.18 |
| 29 | Prod. of Ex. 20 | 0.08 | 0.08 |

The following examples illustrate the compositions of the present invention.

Example 30

A reaction vessel is charged with 563 parts by weight of ethylene glycol monobutyl ether and purged with nitrogen. To the solvent is added 300 parts of a phenolic baking resin sold under the commercial designation "Bakelite BKR-2620." The mixture is agitated for 4 hours at about 65° C. to dissolve the resin, and is then heated to about 98° C. There are added, in order, 114 parts of a copolymer (molecular weight about 1580) prepared from approximately equimolar amounts of styrene and allyl alcohol, 202 parts of an epoxy resin prepared from Bisphenol A and epichlorohydrin and identified as "Epotuf RE-6501," and 80 parts of 75% phosphoric acid. During the addition, an exothermic reaction takes place and the mixture is cooled by means of a cold water bath. Finally, there is added 143 parts of the product of Example 3. The mixture is agitated for 15 minutes at 71° C.; a homogeneous solution is obtained. The concentrations of the ingredients (excluding solvents and volatile matter) are as follows.

| Components: | Percent |
|---|---|
| A | 16.1 |
| B | 21.5 |
| C | 9.7 |
| D | 10.1 |
| E | 42.6 |
| | 100.0 |

Example 31

A composition similar to that of Example 30 is prepared from 1830 parts of diethylene glycol monobutyl ether, 798 parts of BKR–2620, 303 parts of styrene-allyl alcohol copolymer, 540 parts of epoxy resin, 213 parts of 85% phosphoric acid, and 386 parts of the product of Example 3. Just prior to the addition of the product of Example 3, there are added to the mixture 2.3 parts of water and 18.4 parts of an aqueous solution containing calcium dichromate and partially reduced chromic acid and prepared according to Example 22.

To 4075 parts of the product thus obtained is added 183 parts of finely divided silica and an additional 1067 grams of ethylene glycol monobutyl ether. There is obtained a homogeneous solution containing 38.8% nonvolatile matter.

The compositions of this invention are normally applied to metal surfaces by dipping, spraying, brushing or roller-coating. The coating is then baked at a metal temperature of at least about 250° C. until dry. The color of the coated metal depends upon the length of baking time and the temperature of baking and may vary from a gold color to a dark walnut. Apparently, the degree of curing of the phenolic resin constituent governs the color. It is not apparent that variation in baking time appreciably affects the degree of adhesion of the coating to the metal, and therefore the baking time may be chosen so as to provide a surface of the desired color.

Whether or not a siccative topcoat is applied over the coating formed from the composition of this invention, surfaces protected by said coating are extremely resistant to attack by detergents and the like. This is shown by comparing an impeller for an automatic washer which has been coated with the composition of Example 30 with a similar impeller which has not been so coated, after treatment with a 1% solution of a commercial detergent for 24 hours at 71° C. The untreated impeller has a black, smut-like surface formed by corrosion, whereas the impeller treated with the composition of Example 30 is free of corrosion.

Similarly, a steel panel which has been treated with the composition of Example 30 and then painted with a gray epoxy paint shows no corrosion after 48 hours of exposure to detergent as described above, while a blank panel similarly treated is badly corroded.

What is claimed is:

1. A liquid composition of matter, suitable for providing a protective film on a metal surface, which comprises:
    (A) about 15–20 parts by weight of a copolymer of allyl alcohol and a vinyl aromatic compound;
    (B) about 1–50 parts by weight of an epoxy resin;
    (C) about 2–40 parts by weight of phosphoric acid;
    (D) about 5–15 parts by weight of a metal-containing composition prepared by (1) reacting one mole of phosphoric acid with up to about 5 equivalents of an organic epoxide, and (2) reacting the product thus formed with about 0.4–2.0 equivalents of a metal base; and
    (E) about 20–60 parts by weight of a solid phenol-aldehyde resin which is capable of being cured to a thermoset state.

2. The composition of claim 1 wherein component A is a copolymer of allyl alcohol with a styrene.

3. The composition of claim 1 wherein the organic epoxide of component D is propylene oxide and the metal base is zinc oxide.

4. The composition of claim 3 wherein component D is formed by the reaction of one mole of phosphoric acid, about 1–2 equivalents of propylene oxide, and about 0.8–1.0 equivalent of zinc oxide.

5. A composition according to claim 1 which comprises:
    (A) about 15–20 parts by weight of a styrene-allyl alcohol copolymer;
    (B) about 20–25 parts by weight of an epoxy resin;
    (C) about 5–15 parts by weight of phosphoric acid;
    (D) about 5–15 parts by weight of a composition prepared by (1) reacting one mole of phosphoric acid with about one equivalent of propylene oxide, and (2) reacting the product thus formed with about 0.8–1 equivalent of zinc oxide; and
    (E) about 35–50 parts by weight of a solid B-stage phenol-formaldehyde resin which is capable of being cured to a thermoset state.

6. A metal article carrying on its surface a protective coating formed by applying thereto the composition of claim 1 and baking said composition on the metal surface at a metal temperature of at least 250° C.

7. A metal article according to claim 6 which has been further coated with a siccative organic topcoat.

8. A metal article carrying on its surface a protective coating formed by applying thereto the composition of claim 5 and baking said composition on the metal surface at a metal temperature of at least 250° C.

9. A metal article according to claim 7 which has been further coated with a siccative organic topcoat.

References Cited

UNITED STATES PATENTS 3,133,838   5/1964   Higgins _____ 260—837

MURRAY TILLMAN, Primary Examiner.

PAUL LIEBERMAN, Assistant Examiner.

U.S. Cl. X.R.

260—31.2, 32.8, 33.2, 33.4, 831, 836, 837